United States Patent [19]

Porter

[11] Patent Number: 5,560,498

[45] Date of Patent: Oct. 1, 1996

[54] RACK FOR STORING AND TRANSPORTING BICYCLES

[76] Inventor: Kenneth R. Porter, 1332 De Loach Ct., San Jose, Calif. 95125

[21] Appl. No.: 299,442

[22] Filed: Sep. 1, 1994

[51] Int. Cl.$^6$ ................................................ A47F 7/00
[52] U.S. Cl. ............................................ 211/20; 211/22
[58] Field of Search .................................. 211/5, 17, 19, 211/20, 22–24, 181, 188, 189; 224/309, 403, 323, 325, 546

[56] References Cited

U.S. PATENT DOCUMENTS

| | | | |
|---|---|---|---|
| 3,828,993 | 8/1974 | Carter | 224/323 |
| 3,848,784 | 11/1974 | Shimano et al. | 224/323 |
| 3,931,919 | 1/1976 | Gerber et al. | 211/22 |
| 4,326,655 | 4/1982 | Gradek et al. | 224/323 |
| 4,352,432 | 10/1982 | Smith | 211/5 |
| 5,025,932 | 6/1991 | Jay | 211/20 |
| 5,025,933 | 6/1991 | Kalisch | 211/22 |
| 5,036,986 | 8/1991 | Kral | 211/20 |
| 5,036,987 | 8/1991 | Smiedt | 211/22 |
| 5,037,019 | 8/1991 | Sokn | 224/42.45 R |
| 5,377,890 | 1/1995 | Brunner | 224/309 |

*Primary Examiner*—Karen J. Chotkowski
*Assistant Examiner*—Gwendolyn Wrenn
*Attorney, Agent, or Firm*—Robert Samuel Smith

[57] ABSTRACT

A rack for storing and transporting a plurality of bicycles including an array of rails arranged side by side and having elongated slots for receiving brackets, each bracket detachably attachable to the fork of a bicycle so as to maintain the bicycle in an upright position. The brackets can be oriented so that the handle bars can be turned and each bracket positioned at a location on the rails so that the bicycles can be nested close to one another thereby permitting storing and transporting the plurality of bicycles in a confined space such as the cargo space of a van or sports utility vehicle. The rack is removably attached to a flat surface by a combination of straps to prevent separation of the rack from the flat surface and non-slip material to prevent sliding of the rack on the flat surface.

17 Claims, 4 Drawing Sheets

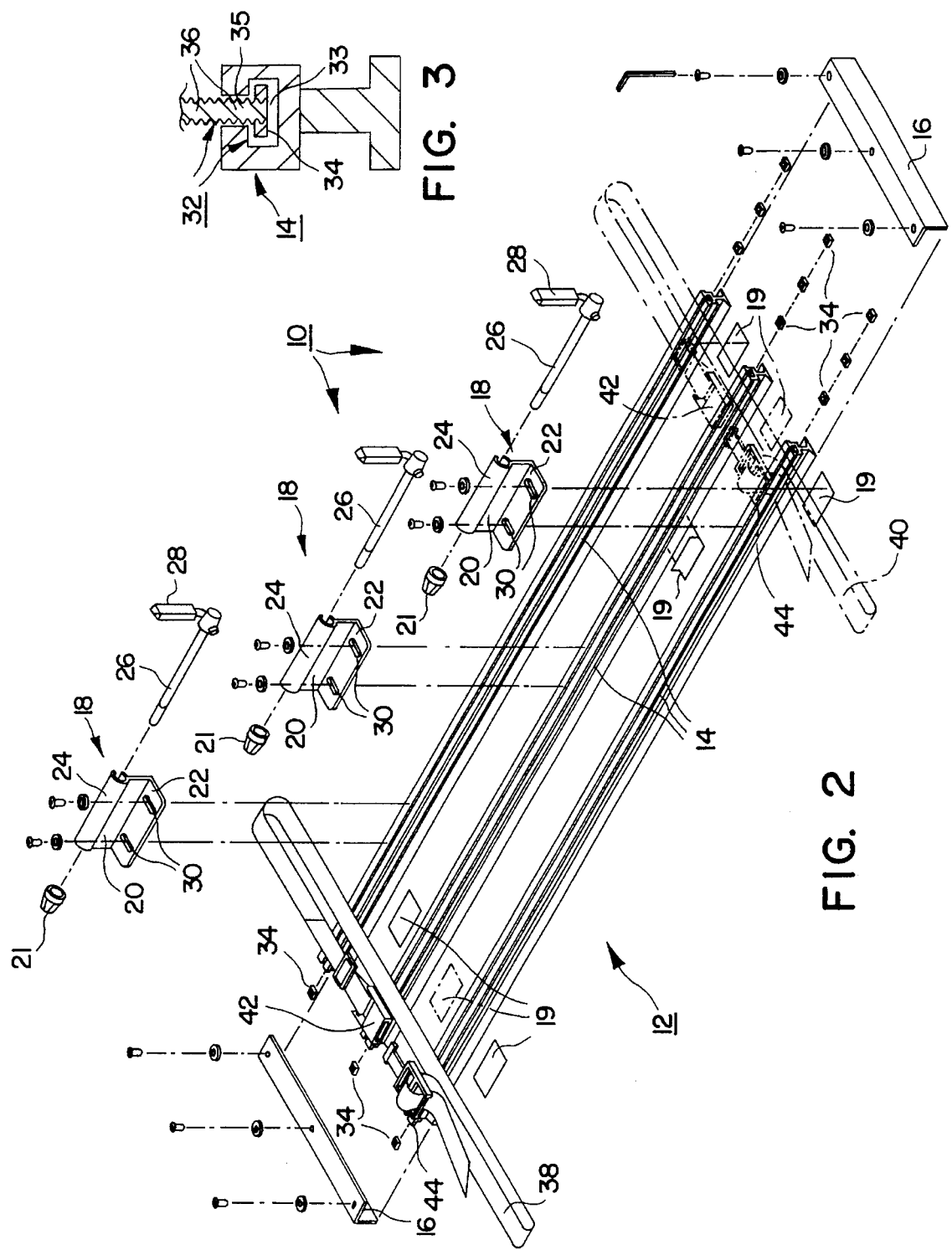

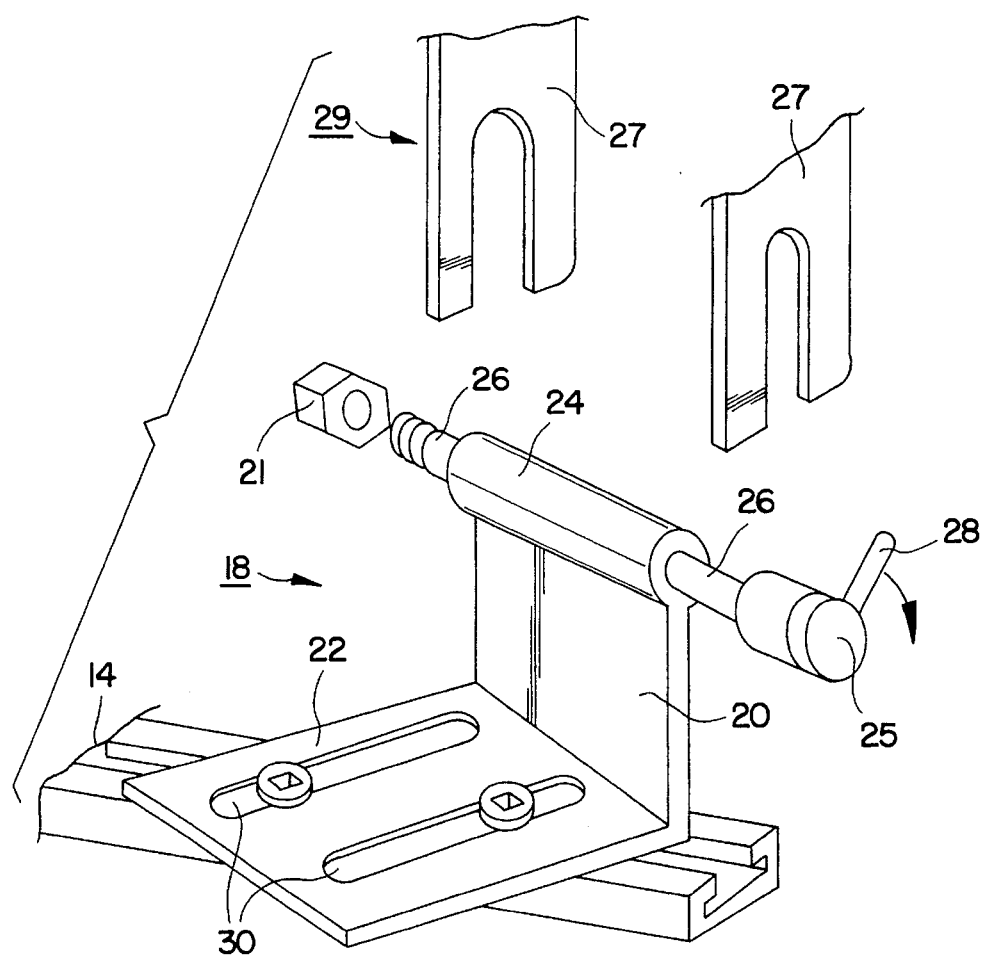
FIG. 8
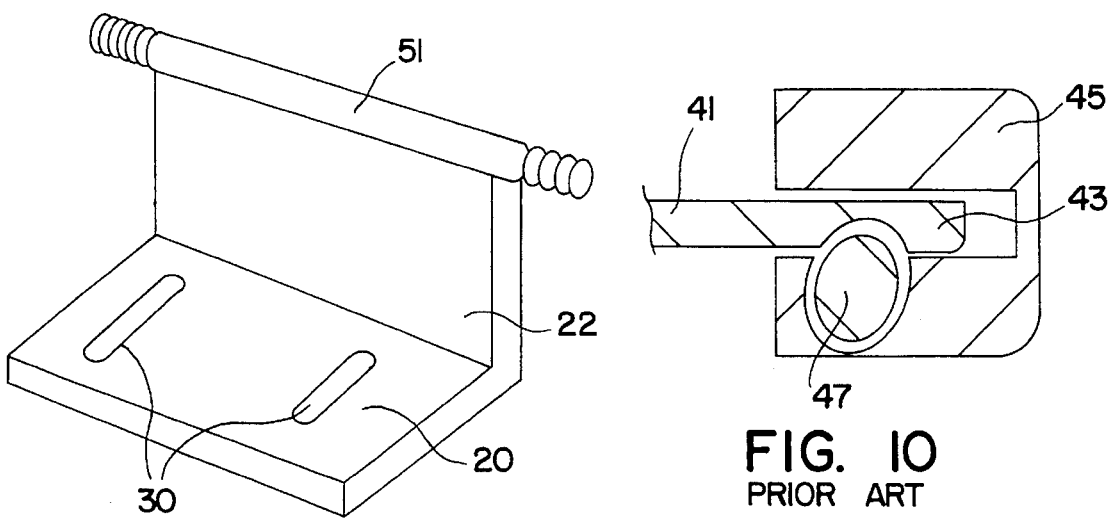
FIG. 9
FIG. 10
PRIOR ART

RACK FOR STORING AND TRANSPORTING BICYCLES

BACKGROUND

1. Field of the Invention

This invention relates to racks for storing AND TRANSPORTING bicycles and particularly to a rack that permits nesting of bicycles against one another such that several bicycles can be stored in a confined space.

2. Prior Art and Information Disclosure

Bicycling has become a sport in which participants transport their bicycles to various locations to participate in an active schedule of events. A number of types of racks have been designed to facilitate shipment of bicycles. These include racks that are attached to the roofs or rears of automobiles and racks that are bolted to the floor of the bed of pickup trucks. Racks are also typically used in stores to display rows of bicycles. Rows of bicycles are stored in warehouses en route to the marketplace.

Racks are designed to support the bicycle in a standing position separate from other bicycles to avoid contact and entanglement between adjacent bicycles that would damage either one or both bicycles.

For example, U.S. Pat. No. 5,025,932 to Jay discloses a bicycle rack including a base support member, an elongated vertically extending tubular post secured at a lower end to the base member and slotted at the upper end to receive the crank of a bicycle pedal.

U.S. Pat. No. 5,025,933 to Kalisch discloses a vertically arranged spiral portion of circularly bent pipe such that the front wheels of a bicycle can be positioned between each loop of the spiral thereby securing the bicycle in a vertical position.

U.S. Pat. No. 5,036,986 to Kral discloses interlocking unitary hollow bodies having wheel retaining slots.

U.S. Pat. No. 5,036,987 to Smiedt discloses a central column including a circular array of vertically extending channels which are open radially outward so that the front wheel of a bicycle can be wheeled onto each channel.

Bike Tight Inc. Paso Robles, Calif. manufactures a rack comprising a base with a single slot for attaching a fixture that maintains alignment of the handle bars with the direction of the slot.

In all of these examples of the prior, the fork is secured such that the handle bar is parallel to the line of bicycles attached to the rack. Furthermore, the bicycles are not staggered in relation to one another. The result of this arrangement is that unused space between neighboring bicycles in the rack equals the approximate length of the handlebar.

It would be desirous to transport bicycles inside motor vehicles such as vans or sports utility vehicles to provide greater security for the bicycles.. Racks that are presently available are not readily suitable in these situations because it is necessary to bolt racks of the present art to a stable surface. This requirement is objectionable to many owners of vehicles not wishing to deface their vehicles by bolt holes.

Furthermore, owners of these vehicles generally do not wish to dedicated the interior of their vehicles to a permanent installation of a rack for transporting bicycles. Generally, after returning from a bicycling event,the owners wish to store their bicycles remote from the vehicles and remove the rack so as to restore the interiors to their original condition.

Another problem with transporting bicycles in the interior of vans and sports utility vehicles is that the space is limited so that the number of bicycles that can be transported in the interior of these vehicles is minimal. Racks of the present state of the art do not lend themselves to making efficient use of these interiors in transporting a plurality of bicycles.

THE INVENTION

Objects

It is an object of this invention to provide a bicycle rack that can be conveniently installed in the interior of a van or sports utility vehicle and support a number of bicycles in an erect position out of contact with one another.

It is another object that the bicycles in the racks be arranged such as to provide most efficient use of the available space so that the number of bicycles that can be stored is substantially larger than racks of the present state of the art.

It is another object that the rack can be conveniently installed when required and removed when not required for the transport of the bicycles.

It is another object that minimal modification, particularly permanent modification, of the interior of the vehicle be required to install the rack.

SUMMARY

This invention is directed toward a bicycle rack which includes a plurality of brackets, each of which is pivotally mounted on a track base and detachably engaged to the forks of the bicycle. The pivotal feature of the brackets permits orienting the handle bars at an angle to the frame of the bicycle. The distance between bicycles can be substantially reduced thus permitting close nesting of the bicycles attached to the rack. The result is that a greater number of bicycles can be stored in tight regions such as the cargo section of a van or sports utility vehicle.

The typical bicycle is structured to permit quick and convenient removal of the front wheel such as when required to replace a damaged wheel or to facilitate storage of the bicycle on the rack. One construction of the prior art shown in FIG. 10 has an axel 41 that extends through the hub (not shown) of the wheel and has one end threaded (not shown) and another end 43 inserted into a cap 45. An eccentrically mounted shaft 47 is rotatably mounted in the cap perpendicular to the axel and which engages the end of the axel. The axel is cinched by turning the shaft. This invention takes advantage of this feature by having the bicycle secured to the rack by removing the front wheel and attaching the fork using a quick release mechanism that is an integral part of the bracket.

The rack base is a frame of extruded rails which are assembled such as to permit adjustable securing of the brackets on the rack.

Most vans and sports utility vehicles have slots and catches that are designed engaging tie down straps for transporting cargo A feature of this invention is a rack base that is detachably secured by straps to the floor of the cargo area of a van of a sports utility vehicle. The straps are secured to the floor by utilizing the existing slots or catches thereby avoiding the necessity to permanently modify the floor of the vehicle. Velcro pads further secure the rack to the floor such as to prevent the rack from sliding when the vehicle is moving.

THE DRAWINGS

FIG. 2 shows an exploded view of the rack of FIG. 1.

FIG. 3 is a sectional view of the rail.

FIG. 8 shows in great detail the attachment of the bracket to the track.

FIG. 9 shows a pin screwed to a top edge of the panel.

FIG. 10 shows a cinch for a wheel axel.

DESCRIPTION OF A PREFERRED MODE

Figure 1:
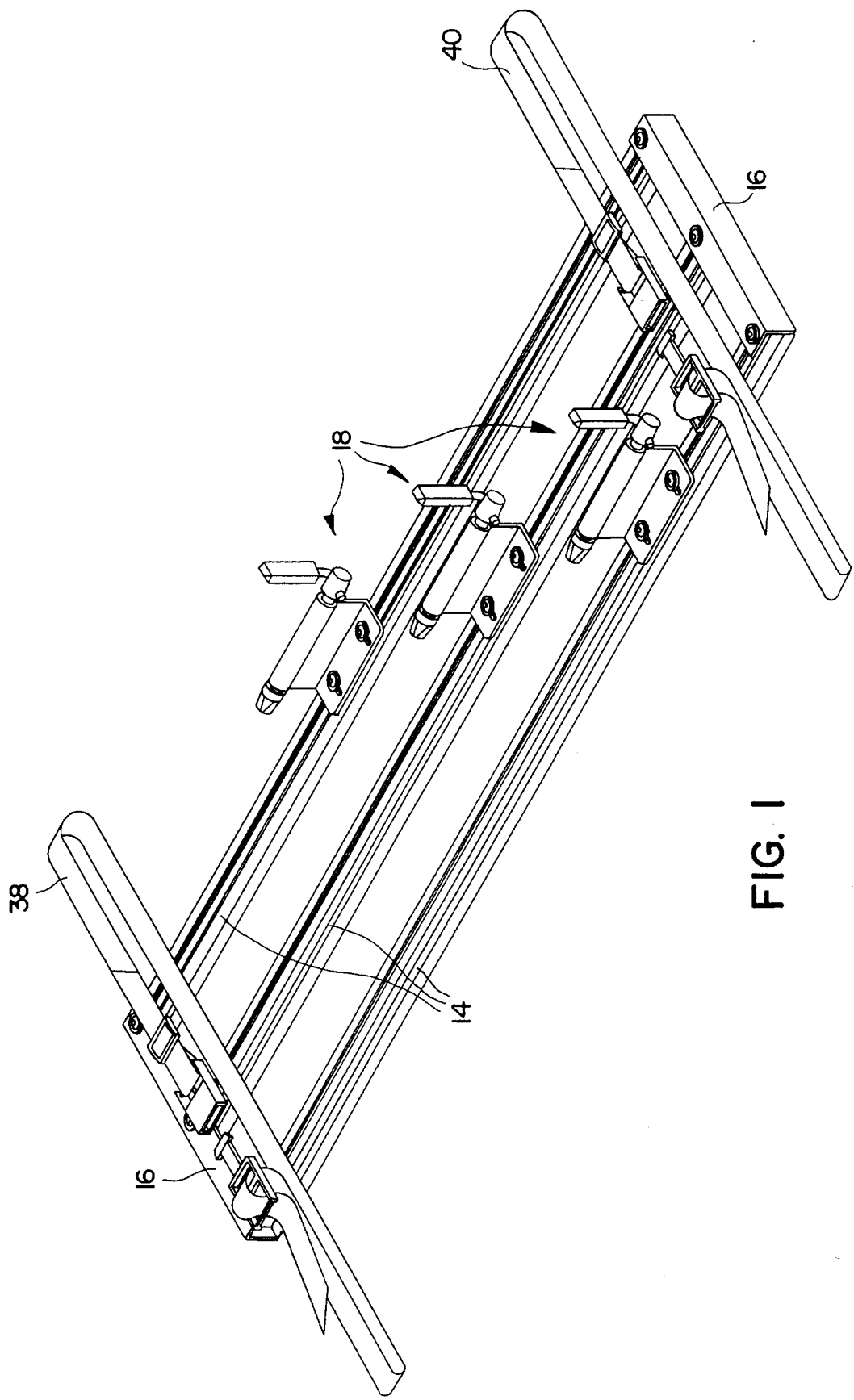
FIG. 1 shows, in perspective, the bicycle rack of this invention

Turning now to a discussion of the drawings, FIG. 1 shows an assembly view of a preferred embodiment of the invention 10. FIG. 2 is an exploded view of FIG. 1.

A base 12 comprises a plurality of rails 14. Each of the rails is preferably an aluminum extrusion. (Three rails are shown in FIGS. 1 and 2). The rails 14 are secured together by angle ends 16 such as to form a rigid frame. FIG. 3 shows a cross section of the rail 14 with an inverted Tee slot 32 extending along the entire length of the rail 14. The inverted Tee slot 32 has a head section 33 and a neck section 35 for receiving a fastener slidably positionable in a range of locations on the rail. In one embodiment, the fastener is nut 34 positioned in the head section and a bolt 36 extending through the neck section 35 and screwed into the nut 34. Alternatively, the head of a bolt can be slid into the Tee slot 32 as a fastening means to the rail 14.

A plurality of brackets 18 (three are shown) are shown in FIGS. 1 and 2 and shown to greater advantage in FIG. 8. Each bracket 18 is a length of angle including two panels 20 and 22, each panel vertically joined to the other panel along a common edge. One panel 20 has a sleeve 24 attached along an edge opposite the joining edge.

The sleeve 24 receives an axel pin 26 that is turned in the sleeve 24 by turning a on one end of the pin 26. The other end of the pin 26 protruding from the other end of the sleeve 24 is threaded for receiving a nut 21. FIG. 8 shows a bicycle fork 29 poised for straddling the ends of the bracket and with stems 27 of the fork 29 engaging respective ends of pin 26. The front wheel has been removed and the rest of the bicycle cut away. As is known in the art, the lever 28 is coupled to the end of the pin 26 by an eccentric inside cap 25 so that the forks are captured on the pin 26 by tightening nut 21 then cinching the forks 27 on the pin 26 by turning lever 28.

The other panel 22 of the bracket 18 has a pair of slots 30. FIG. 3 is a sectional view showing details for securing the panel 20 of angle bracket 18 bolted against the rail 14 by a bolt 36 having an allen head passing through the slot 30 and screwing into nut 34 slidably positioned in T-slot 32. An important feature of this invention is the orientation of the bracket at an angle to the track 14 as discussed below.

In one embodiment, the array of rails is simply lying unattached to a floor which may be satisfactory for a stationary floor such as in a store. In another situation, as discussed below the floor may be moving as in a vehicle so that the array is subject to sliding or inadvertently separating from the floor such as in a moving vehicle. In the contest of this specification, "array attached to the surface includes a permanent attachment such as by bolting whereas detachable attachment means temporary attachment such as with belts described below.

In FIG. 2, two straps, 38 and 40, are shown. One strap 38 is engages one end of the rack 12 and another strap 40 (in phantom) engages another end of the rack 12. Each strap, 38 and 40, has a quick release buckle 42 and a cinch 44 for adjusting the length of the respective strap 38 and 40. Each strap engages catch members built into the floor of the vehicle not shown in FIGS. 1 and 2 but discussed in connection with FIGS. 4, 5 and 6.

Figure 4:
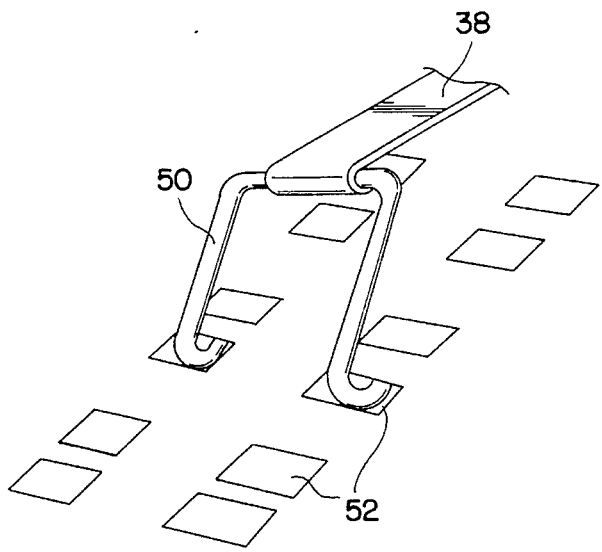
FIG. 4 shows one arrangement for fastening the track to the floor of the vehicle.

FIG. 4 shows a strap 38 secured to the floor of a vehicle by means of a hook 50 detachably engaged with a bar 52. The bar is one of a row of bars, each bar formed by two neighboring apertures in the floor of the vehicle.

Figure 5:
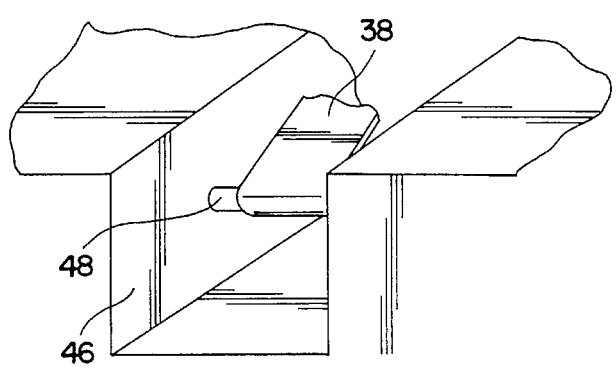
FIG. 5 shows another arrangement for fastening the track to the floor of the vehicle.

FIG. 5 shows a slot 46 found in the floor of many vans and sports utility vehicles. The slot has one or more bars 48 which engage hardware on the seat (removed) but which may be used to attach the strap of this invention. The strap, 38 or 40, is shown wrapped around the bar 48 in FIG. 5.

Figure 6:
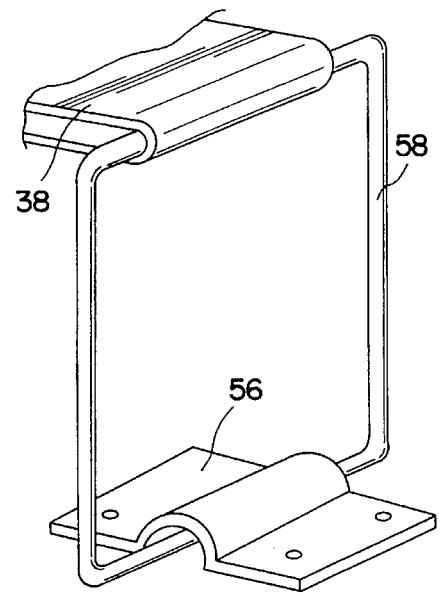
FIG. 6 shows another arrangement for fastening the track to the floor of the vehicle.

FIG. 6 shows another embodiment in which a catch 56 is bolted to the floor 54 of the vehicle and a loop 58 engages the the catch 56 and detachably engages the strap 38.

FIG. 2 shows patches 19 of non-slip material such as hook and loop patches (VELCRO Dual Lock patches (manufactured by 3-M, Inc.) rubber, etc. (Dual Lock material is a heavy "hook" type material that detachably adheres to heavy carpet sometimes found on the floors of vehicles.) These patches are secured between the bottom of the rack and the floor of the vehicle. The non-slip patches prevent the rack from sliding on the floor of the vehicle while the straps prevent the track from separating vertically from the floor of the vehicle as would otherwise occur when the vehicle hit a bump.

Figure 7:
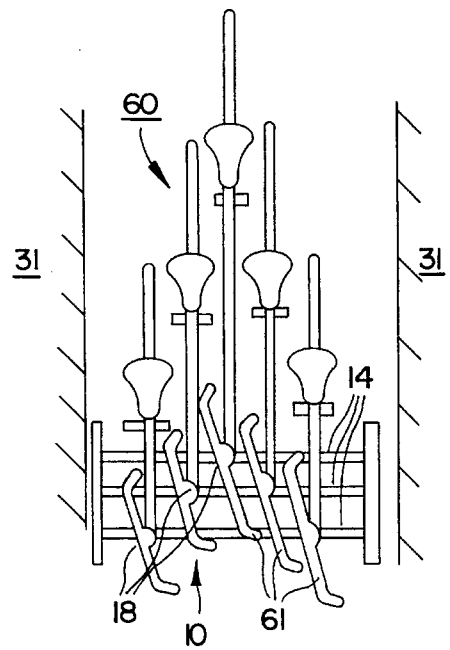
FIG. 7 shows five bicycles stored in the rack.

FIG. 7 is a top view of five bicycles 60 mounted in the rack 10 between sidewalls 31 in the interior of a vehicle. The brackets 18 are turned so that the handlebars 62 are turned and the brackets are distributed on three tracks 14. Nesting the handlebars, as shown and distributing the brackets on the rails permits nesting the bicycles 60 so that five or more bicycles can be stored in the cargo area of the typical van or sports utility vehicle.

Other variations and modifications may be contemplated that are within the scope of this invention.

For example, the tracks may have a telescoping construction that permits adaptation to various widths of vehicles. More or less than three tracks may be used. The rack may be hung on a wall such as in a store or warehouse.

As shown in FIG. 9, the means for attaching the bracket may be a pin 51 welded along the edge of the upstanding panel 20 in place of the sleeve 24.

The selection of non-slip patches may be be such that attachment of the array to the flat surface may be strong enough to prevent both separation and sliding of the array on the supporting surface.

When the flat surface is not moving (such as in a store) then the straps alone with out the non-slip patches may be sufficient to secure the array in place or, in such a situation, the straps may not be needed at all.

In place of the straps, the rack may be permanently bolted to the floor of the vehicle.

In view of these and other variations which are within the scope of the invention, I wish to define my invention by the appended claims.

I claim:

1. A rack for storing bicycles, each bicycle having a frame with a fork having a pair of stems on a first end of said fork adapted for engaging the pin of a wheel and having a handle bar on a second end, said rack comprising:

at least one straight rail oriented in a first direction;

each said rail being an elongated member having a slot, said slot having an inverted Tee cross section and having a head section and a neck section adapted for receiving a plurality of fasteners slidably positionable in a range of locations along said rail;

a plurality of fasteners slidably positioned in said range of locations in each one of said slots, each fastener adapted for engaging one of a plurality of brackets;

a plurality of brackets, one said bracket for each said bicycle;

means adapted for detachably attaching each one of said first plurality of brackets to said stems at said first end of said fork of any one of said each bicycle such that, when said each one of said brackets engages one of said fasteners in said slot, a respective handle bar of said bicycle having said stem attached to said bracket can be oriented in a range of second directions oblique to at least one of said rails;

each direction of said range of second directions and each location of said range of locations selected such that each said bicycle is nested next to its neighboring one of said bicycles so as to reduce a space required to store said bicycles, means adapted for securing said array to a flat surface.

2. A rack as in claim 1 wherein said means for securing comprises means for detachably securing said array at least one of said rails to said flat surface.

3. A rack as in claim 2 wherein said means adapted for detachably securing said array to a flat surface comprises a third plurality of non-slip patches attached to a surface of at least one of said rails and a third plurality of non-slip material attached to said flat surface and operably arranged to detachably engage said non-slip patches such as to prevent sliding and separation of at least one of said rails from said flat surface.

4. A rack as in claim 2 wherein said means adapted for detachably securing at least one of said rails to a flat surface comprises a third plurality of non-slip patches attached to a surface of at least one of said rails and operably adapted to detachably engage fabric laminated to said flat surface such as to prevent separation of at least one of said rails from said flat surface.

5. A rack as in claim 2 wherein said means adapted for detachably securing at least one of said rails to a flat surface comprises:

at least one strap means secured to said flat surface for receiving a loop of said strap in operable combination with said strap to prevent separation of at least one of said rails from said flat surface.

6. A rack as in claim 5 which comprises a third plurality of patches of non-slip material operably arranged on said flat surface and a surface of at least one of said rails such as to prevent sliding of at least one of said rails on said flat surface.

7. A rack as in claim 2 which comprises at least one strap adapted for engaging a means for engaging said strap and secured to said flat surface.

8. A rack as in claim 7 which comprises a third plurality of patches of non-slip material operably arranged on said flat surface and a surface of each one of at least one of said rails such as to prevent sliding of said array on said flat surface.

9. A rack as in claim 1 wherein each one of said brackets comprises:

an angle member having a first panel and a second panel, said first and second panels joined along a common edge to form said angle member;

each one of said first panels having at least one slot for receiving one of said fasteners and fastening said bracket to one of said at least one rail;

means on an edge of said second panel opposite said common edge adapted for detachably engaging each one of said stems at said first end of one of said forks.

10. A rack as in claim 9 wherein said means for detachably engaging comprises:

a sleeve oriented parallel to and mounted on said opposite edge of the second panel;

a pin extending through said sleeve and having one end which is threaded extending from one end of said sleeve and another end extending from another end of said sleeve and adapted such that one of said forks can be be positioned to straddle said bracket with one stem of said pair of stems detachably engaged to said one threaded end and another stem of said pair of stems detachably engaged to said another end of said pin;

means for cinching said another end of said pin engaged with said another stem.

11. A rack as in claim 10 wherein said another end of said pin is threaded and said means for cinching comprises a nut screwed onto said another end of said pin.

12. A rack as in claim 10 wherein said means for cinching comprises;

a cap mounted on said another end of said pin;

an eccentric shaft rotatably mounted in said cap;

said eccentric shaft engaging said another end of said pin;

a lever attached to an eccentric shaft for turning said shaft in said cap;

said cap, eccentric shaft, another end of said pin and said lever all constructed and arranged in operable combination with one another such that when said pin in said sleeve with one end of said pin having a nut screwed onto said one end of said pin and engaging one stem and said another stem engaging said another end of said stem, said pin is cinched by turning said lever.

13. A rack as in claim 10 wherein said means for cinching comprises:

said another end of said pin having a thread;

a nut screwed onto said another end of said pin.

14. A rack as in claim 9 wherein said means adapted for detachably engaging comprises:

a pin secured on said edge of second panel opposite said common edge;

said pin having two threaded ends and extending from respective ends of said second panel;

a pair of nuts, each nut screwed onto one of said threaded ends of said pin respectively.

15. A rack as in claim 1 wherein said at least one rail is a plurality of rails.

16. A rack as in claim 1 wherein said at least one rail is an extrusion.

17. A rack as in claim 1 wherein said rail is aluminum.

* * * * *